US010767744B2

(12) United States Patent
Kleiss

(10) Patent No.: US 10,767,744 B2
(45) Date of Patent: Sep. 8, 2020

(54) GEARS AND GEAR COMBINATIONS

(71) Applicant: Victrex Manufacturing Limited, Thornton Cleveleys (GB)

(72) Inventor: Roderick Kleiss, Thornton Cleveleys (GB)

(73) Assignee: VICTREX MANUFACTURING LIMITED, Thornton Cleveleys Lancashire (GB)

( * ) Notice: Subject to any disclaimer, the term of this patent is extended or adjusted under 35 U.S.C. 154(b) by 112 days.

(21) Appl. No.: 16/313,718

(22) PCT Filed: Jun. 30, 2017

(86) PCT No.: PCT/GB2017/051940
§ 371 (c)(1),
(2) Date: Dec. 27, 2018

(87) PCT Pub. No.: WO2018/002662
PCT Pub. Date: Jan. 4, 2018

(65) Prior Publication Data
US 2019/0170236 A1 Jun. 6, 2019

(30) Foreign Application Priority Data
Jul. 1, 2016 (GB) .................................. 1611572.7

(51) Int. Cl.
*F16H 55/16* (2006.01)
*F16H 55/06* (2006.01)
*F16H 55/18* (2006.01)

(52) U.S. Cl.
CPC .............. *F16H 55/16* (2013.01); *F16H 55/06* (2013.01); *F16H 55/18* (2013.01); *F16H 2055/065* (2013.01); *F16H 2055/185* (2013.01)

(58) Field of Classification Search
CPC .......... F16H 55/16; F16H 55/06; F16H 55/18; F16H 2055/065; F16H 2055/185
See application file for complete search history.

(56) References Cited

U.S. PATENT DOCUMENTS 4,149,431 A * 4/1979 Rouverol ................ F16H 55/08
74/462
5,181,433 A * 1/1993 Ueno ...................... F16H 55/08
74/409
(Continued)

FOREIGN PATENT DOCUMENTS

EP 1512890 A2 3/2005
JP 2001221322 A 8/2001
(Continued)

OTHER PUBLICATIONS

International Search Report and Written Opinion of corresponding International Application No. PCT/GB2017/051940; dated Sep. 5, 2017; 12 pages.
(Continued)

*Primary Examiner* — David M Fenstermacher
(74) *Attorney, Agent, or Firm* — Shumaker, Loop & Kendrick, LLP

(57) ABSTRACT

This anti-backlash gear includes a gear wheel and gear teeth. Each gear tooth comprises first and second flanks, a top face and a bottom face, wherein for each gear tooth each flank extends from the top face to the bottom face, wherein the gear teeth comprise a polymeric material which comprises a repeat unit of form I wherein t1, and w1 independently represent 0 or 1 and v1 represents 0, 1 or 2. For each gear tooth, at least one of said flanks comprises two or more surfaces arranged to form a single protrusion extending along the at least one said flank such that a tooth thickness of each gear tooth varies between the top face and the bottom face of said gear tooth in a direction parallel to an
(Continued)

axis of rotation of the gearwheel in operation. In use, the single protrusion is elastically deformable so as to absorb backlash.

20 Claims, 3 Drawing Sheets

(56) References Cited

U.S. PATENT DOCUMENTS

| | | | | |
|---|---|---|---|---|
| 5,555,776 | A * | 9/1996 | Gazza | F16H 53/00 |
| | | | | 250/231.13 |
| 6,354,395 | B1 * | 3/2002 | Cheng | B62D 5/0409 |
| | | | | 180/444 |
| 6,644,947 | B2 * | 11/2003 | Cavanaugh | F01C 1/084 |
| | | | | 418/150 |
| 7,415,907 | B2 * | 8/2008 | Hagihara | B41J 23/02 |
| | | | | 74/457 |
| 7,526,977 | B2 * | 5/2009 | Masui | F16H 55/18 |
| | | | | 74/409 |
| 7,633,837 | B2 * | 12/2009 | Daout | G04B 35/00 |
| | | | | 368/220 |
| 7,698,964 | B2 * | 4/2010 | Kashimura | F16H 55/16 |
| | | | | 74/443 |
| 7,752,937 | B1 * | 7/2010 | Dornan | F16H 55/18 |
| | | | | 74/409 |
| 7,814,809 | B2 * | 10/2010 | Shinohara | F16H 55/06 |
| | | | | 74/409 |

FOREIGN PATENT DOCUMENTS

| | | |
|---|---|---|
| JP | 2004108436 A | 4/2004 |
| WO | 2008034669 A1 | 3/2008 |

OTHER PUBLICATIONS

UK Search Report of corresponding GB Application No. 1611572.7; dated Dec. 22, 2016; 5 pages.

* cited by examiner

GEARS AND GEAR COMBINATIONS

CROSS REFERENCE TO RELATED PATENT APPLICATIONS

This application claims the benefit of and priority to International Application No. PCT/GB2017/519740 filed on Jun. 30, 2017 and GB Application No. 1611572.7 filed on Jul. 1, 2016.

TECHNICAL FIELD AND BACKGROUND OF THE INVENTION

This invention relates to gears and gear combinations, for example for use in automotive applications.

In modern day gearing, for instance when transmission loads are pulsing, such as when they are driving camshafts, reciprocating pumps or counterbalance jack shafts in piston engines, a great deal of noise, vibration and harshness (NVH) can be generated by the gears. NVH can be generated when the gears move at different angular velocities to one another under steady state operation or due to changes in transmission load or speed.

The origin of such gear rattle is in a solution adopted to prevent the binding of gear teeth. When gears are in mesh (i.e. when they are engaged with one another), they must be able to work within the framework of their tolerances. Not all gears will be manufactured identically. Some will have more eccentricity than others; some will have larger or smaller tooth thicknesses; the centre distance of the gears to their mates will vary due to manufacturing accuracy. It is also important that the gears can allow for thermal expansion.

To prevent these issues from causing the teeth to bind as they drive, conventionally backlash is introduced. Backlash is the term used for establishing a set clearance between the meshing teeth as shown in FIG. 1 where the backlash 1 is the distance between the two arrow heads. The backlash can result in gear rattle and consequent fraying of the gear teeth.

With metal gears, this unwanted behaviour can be limited by slicing the gear into two parallel scissor gears and then spring loading them against each other. Springs are placed between two gear wafers to keep them separated and when the gears are placed in mesh with their mate, the teeth of the two wafers are squeezed together so that backlash is taken up. During operation, the opposite wafer gear will take up the backlash as long as the driving load does not exceed the spring force of the anti-backlash gear. This works very well for metal gears but is expensive and in effect reduces the strength of the gear by the amount it is thinned for the reversing action.

Accordingly there is a need for a gear that reduces the necessity for backlash and addresses the problems of known anti-backlash gears.

According to a first aspect of the present invention there is provided an anti-backlash gear comprising:

a gear wheel and gear teeth, wherein each gear tooth comprises first and second flanks, a top face and a bottom face, wherein for each gear tooth each flank extends from the top face to the bottom face, wherein the gear teeth comprise a polymeric material which comprises a repeat unit of formula I

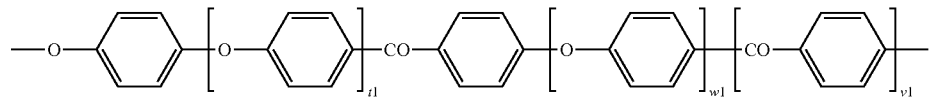

wherein t1, and w1 independently represent 0 or 1 and v1 represents 0, 1 or 2, and wherein for each gear tooth i) at least one of said flanks comprises two or more surfaces arranged to form a single protrusion extending along the at least one said flank such that a tooth thickness of each gear tooth varies between the top face and the bottom face of said gear tooth in a direction parallel to an axis of rotation of the gear wheel in operation, wherein the single protrusion, in use, is elastically deformable so as to absorb backlash.

It has surprisingly been found that the teeth of a gear can themselves act as the anti-backlash control for gear systems. The single protrusion of gears with the arrangement of the present invention are able to elastically deform and therefore when torque is applied to the gear it can distort to take up full load capability. Furthermore the deformation can be distributed locally as opposed to a material with a higher Young's modulus. Moreover, the gear of the present invention is less likely to cause the jamming/binding that contributes to noise and the damage of gear teeth.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

References herein such as "in the range x to y" are meant to include the interpretation "from x to y" and so include the values x and y.

The term "tooth thickness" is defined as an arc length of a given radius "x" coincident with an axis of rotation of the gear wheel in operation, wherein said arc length has endpoints coinciding with each flank of a gear tooth. For helical gears, this definition implies a transverse tooth thickness as the end points are in a plane normal to the axis of rotation of the gear wheel.

All values of Young's modulus set out in the present application are measured in accordance with the ASTM E111-04(2010) standard.

The term "edge" means a boundary where two surfaces of a gear tooth meet, wherein said edge may be a transitional edge, such as a chamfered edge or a rounded edge.

Preferably in a gear of the present invention the tooth thickness, though varying along an axial position between the top and bottom faces of the gear, may be consistent for all teeth at that axial position (within manufacturing tolerance deviations). Preferably each gear tooth has the same geometric design. In some preferred embodiments the flanks of each gear tooth are not symmetric.

Preferably the gear teeth are together a one-piece unit. This arrangement provides advantages in terms of ease of manufacture and mechanical properties. The term "one-piece" means a single unit of material and excludes separate but joined elements. The anti-backlash gear may be a one-piece unit, i.e. the gear wheel may be included within the one-piece unit of the gear teeth.

Preferably the top tooth face and the bottom tooth face of each gear tooth are substantially parallel to each other. More preferably the top tooth face and the bottom tooth face of each gear tooth are exactly parallel to each other.

The top tooth face and/or the bottom tooth face of each gear tooth may be substantially parallel to or coextensive with respective top and bottom faces of the gear wheel. Preferably both the top tooth face and the bottom tooth face of each gear tooth are substantially parallel to or coextensive with respective top gear face and bottom gear face of the gearwheel.

Each gear tooth may further comprise a leading edge or leading surface (i.e. a "top land/peak" or "tip") located between the first and second flanks of said each gear tooth. Transitional surfaces may separate the leading surface from the flanks (i.e. a "tip radius").

In some embodiments the anti-backlash gear may be a driving gear in operation. When the anti-backlash gear is a driving gear, preferably for each gear tooth at least one of said flanks, that comprises two or more surfaces arranged such that a tooth thickness of each gear tooth varies between the top tooth face and the bottom tooth face of said gear tooth in a direction parallel to an axis of rotation of the gear wheel in operation, is not a driving flank in operation. I.e. preferably said flank is a coasting flank. The term "driving flank" means a flank that in operation transmits power from a driving gear to a driven gear by contacting a complementary flank (i.e. a driven flank) of the driven gear.

In some embodiments the anti-backlash gear may be a driven gear in operation. When the anti-backlash gear is a driven gear, preferably for each gear tooth at least one of said flanks, that comprises one or more surfaces arranged such that a tooth thickness of each gear tooth varies between the top tooth face and the bottom tooth face of said gear tooth in a direction parallel to an axis of rotation of the gear wheel in operation, is not a driven flank in operation. I.e. preferably said flank is a coasting flank.

In some embodiments preferably for each gear tooth each of said flanks comprises more than two surfaces arranged such that a tooth thickness of each gear tooth varies between the top face and the bottom face of said gear tooth in a direction parallel to an axis of rotation of the gear wheel in operation. The two surfaces of the at least one flank define the shape of the protrusion.

Preferably, when the gear in operation may act in both directions (clockwise and anticlockwise), said at least one of said flanks, that comprises two or more surfaces arranged such that a tooth thickness of each gear tooth varies between the top face and the bottom face of said gear tooth in a direction parallel to an axis of rotation of the gear wheel in operation, is more frequently the coasting flank. With such an operation more preferably for each gear tooth each of said flanks comprises two or more surfaces arranged such that a tooth thickness of each gear tooth varies between the top face and the bottom face of said gear tooth in a direction parallel to an axis of rotation of the gear wheel in operation.

In some embodiments the variation in tooth thickness of each gear tooth between the top tooth face and the bottom tooth face of said gear tooth in a direction parallel to an axis of rotation of the gear wheel in operation may be present in relation to the entire gear tooth.

In some alternative embodiments the variation in tooth thickness of each gear tooth between the top face and the bottom face of said gear tooth in a direction parallel to an axis of rotation of the gearwheel in operation may be present in relation to part of the gear tooth.

For each gear tooth at least one of said flanks may comprise three or more surfaces arranged such that a tooth thickness of each gear tooth varies between the top face and the bottom face of said gear tooth in a direction parallel to an axis of rotation of the gearwheel in operation.

Preferably said two or more surfaces, arranged such that a tooth thickness of each gear tooth varies between the top face and the bottom face of said gear tooth in a direction parallel to an axis of rotation of the gear wheel in operation, are angled such that said two or more surfaces form a protrusion from said at least one flank. Preferably said protrusion from said at least one flank is present over less than 90%, more preferably less than 75%, even more preferably less than 60%, even more preferably less than 50% of a length of said flank. Said length of said flank is defined as the dimension of said flank in a radial direction from adjacent said gear wheel to adjacent a leading edge or leading surface (i.e. a "top land/peak" or "tip") of said gear tooth. In some embodiments preferably for each gear tooth each of said flanks comprises two or more surfaces angled such that said two or more surfaces form a protrusion from at least one of said flanks.

In some embodiments the protrusion from said at least one flank may be present over a part of said length of said at least one flank that is adjacent a leading edge or leading surface (i.e. a "top land/peak" or "tip") of said gear tooth. In an alternative embodiment the protrusion from said at least one flank may be present over a part of said length of said at least one flank that is between said gear wheel and a leading edge or leading surface (i.e. a "top land/peak" or "tip") of said gear tooth. Preferably said part of said length of said flank, that is between said gear wheel and a leading edge or leading surface (i.e. a "top land/peak" or "tip") of said gear tooth, is spaced apart from said gear wheel by at least 10%, more preferably at least 20%, even more preferably at least 25% of said length of said flank. Preferably said part of said length of said flank, that is between said gearwheel and a leading edge or leading surface (i.e. a "top land/peak" or "tip") of said gear tooth, is spaced apart from the leading edge or leading surface (i.e. a "top land/peak" or "tip") of said gear tooth by at least 10%, more preferably at least 20%, even more preferably at least 25% of said length of said flank. In some preferred embodiments said part of said length of said flank, that is between said gear wheel and the leading edge or leading surface (i.e. a "top land/peak" or "tip") of said gear tooth, is spaced apart from said gear wheel by at least 10% of said length of said flank, and is spaced apart from the leading edge or leading surface (i.e. a "top land/peak" or "tip") of said gear tooth by at least 10% of said length of said flank. In some preferred embodiments the protrusion protrudes substantially towards a neighbouring or adjacent gear tooth.

In some preferred embodiments said one or more surfaces, arranged such that a tooth thickness of each gear tooth varies between the top tooth face and the bottom tooth face of said gear tooth in a direction parallel to an axis of rotation of the gear wheel in operation, each have a flat profile (i.e. said one or more surfaces each appears to be flat) when viewing a cross section of each gear tooth taken along a plane that intersects a given radius "y", coincident with an axis of rotation of the gear wheel in operation, wherein the intersection occurs at each flank of a gear tooth at each location that is coincident with given radius "y". More preferably each of said flanks of each gear tooth comprise one or more surfaces each have a flat profile (i.e. said one or more surfaces each appears to be flat) when viewing a cross section of each gear tooth taken along a plane that intersects a given radius "y", coincident with an axis of rotation of the gear wheel in operation, wherein the intersection occurs at each flank of a gear tooth at each location that is coincident with given radius "y".

In some preferred embodiments the gear teeth of the anti-backlash gear are arranged to engage with gear teeth of a complementary gear in operation such that each gear tooth of the anti-backlash gear initially contacts one or more gear teeth of the complementary gear at one or more edge of said each gear tooth of the anti-backlash gear. Preferably additionally the gear teeth of the anti-backlash gear are arranged to engage with gear teeth of a complementary gear in operation such that each gear tooth of the anti-backlash gear solely contacts one or more gear teeth of the complementary gear at one or more edge of said each gear tooth of the anti-backlash gear.

Preferably said one or more edge of said each gear tooth is one or more edge of said first or second flank of each gear tooth.

In some preferred embodiments said edge of the protrusion is substantially a non-transitional edge, i.e. the boundary where the two surfaces meet is substantially a line rather than e.g. a chamfered edge or a rounded edge. The term "substantially" means in this context "largely" or "mostly". Preferably said edge is a non-transitional edge, i.e. the boundary where the two surfaces meet is a line rather than e.g. a chamfered edge or a rounded edge.

In an alternative embodiment the edge is preferably a transitional edge, e.g. a chamfered edge or a rounded edge. In this embodiment preferably the surface area of the transitional edge is smaller than the surface area of either of two surfaces that meet forming said transitional edge. More preferably the surface area of the transitional edge is less than half of the surface area of either of two surfaces that meet forming said transitional edge. Even more preferably the surface area of the transitional edge is less than a quarter of the surface area of either of two surfaces that meet forming said transitional edge.

In some embodiments the protrusion from said at least one flank may comprise one or more protruding edge. Advantageously said one or more protruding edge is said one or more edge of said each gear tooth of the anti-backlash gear at which each gear tooth of the anti-backlash gear initially, and preferably solely, contacts one or more gear teeth of the complementary gear in operation.

Preferably said protruding edge of said each gear tooth of the anti-backlash gear protrudes from each flank of said each gear tooth. Preferably said protruding edge is formed by a gradual variance of the tooth thickness of each gear tooth. Preferably said flank from which said protruding edge protrudes each comprises two surfaces only. Preferably the angle between said two surfaces at said protruding edge is less than 170 degrees, more preferably less than 160 degrees, even more preferably less than 150 degrees, even more preferably less than 140 degrees, but preferably more than 60 degrees, even more preferably more than 80 degrees, even more preferably more than 100 degrees, even more preferably more than 120 degrees.

The arrangement of this embodiment utilises a change in tooth thickness to ensure that said protruding edge contacts one or more gear teeth of the complementary spur gear and affords an anti-backlash function. The angle is a function of available height and necessary backlash to properly tolerance the gear.

In some alternative embodiments the protrusion from said at least one flank may comprise a protruding surface. Said protruding surface may be formed by said at least one flank comprising three or more surfaces. Preferably said protruding surface is substantially, more preferably exactly, perpendicular to the top tooth face and/or bottom tooth face of said gear tooth. Preferably said protruding surface is substantially, more preferably exactly, perpendicular to a normal plane of the gear tooth. Preferably said protruding surface is substantially, more preferably exactly, parallel to a cross sectional surface extending between, and perpendicular to, the top face and the bottom face of said gear tooth. Said protruding surface preferably has a constant height. The height of the protruding surface is defined as the dimension of said protruding surface in a direction parallel to an axis of rotation of the gear wheel in operation. Preferably the height of the protruding surface is less than 50%, more preferably less than 40%, even more preferably less than 30%, even more preferably less than 20% of the distance between the top face and the bottom face in a direction parallel to an axis of rotation of the gear wheel in operation. Preferably the height of the protruding surface is more than 1%, more preferably more than 3%, even more preferably more than 4%, even more preferably more than 5% of the distance between the top face and the bottom face in a direction parallel to an axis of rotation of the gear wheel in operation. The arrangement of this embodiment utilises a protruding surface to provide the anti-backlash function. Such a protruding surface may be less prone to wear than a protruding edge.

The gear teeth of the anti-backlash gear may be arranged to engage with gear teeth of a complementary gear such that each gear tooth of the anti-backlash gear solely contacts one or more gear teeth of the complementary gear at one or more protruding surface of said each gear tooth of the anti-backlash gear.

In some embodiments the gear teeth may be angled such that a leading edge or leading surface (i.e. a "top land/peak" or "tip") of each gear tooth is not parallel with respect to an axis of rotation of the gear wheel in operation.

Where, for each gear tooth, at least one of said flanks is angled such that said flank is not parallel with respect to an axis of rotation of the gear wheel in operation, the top face and the bottom face of said gear tooth may be offset.

Where, for each gear tooth, at least one of said flanks is angled such that said flank is not parallel with respect to an axis of rotation of the gear wheel in operation, preferably the first and second flanks of said each gear tooth are substantially parallel to each other. In an alternative embodiment the first and second flanks of said each gear tooth may be angled such that they are not substantially parallel to each other. Preferably the first and second flanks of each gear tooth are angled away from perpendicular to the top face and the bottom face of said each gear tooth to substantially the same degree, more preferably angled away from perpendicular to the top tooth face and the bottom tooth face of said each gear tooth to the same degree. Preferably at least one of the first and second flanks of each gear tooth are angled away from perpendicular to the top face and the bottom face of said each gear tooth by at least 2 degrees, more preferably at least 3 degrees, even more preferably at least 4 degrees, but preferably by at most 8 degrees, more preferably at most 7 degrees, even more preferably at most 6 degrees.

The use of a gear with angled flanks can effectively increase the standard tooth thickness as it functions in mesh with a complementary gear, affording a larger apparent tooth thickness, by decreasing the size of the gaps that the gear teeth of the complementary gear can enter when the gear teeth engage. Specifically, an edge of each gear tooth, wherein said edge is located closest to one face of a gear wheel, may be brought closer to an opposing edge of an adjacent gear tooth, wherein said opposing edge is located closest to an opposing face of the gear wheel (see FIG. 2). Such an arrangement can take up the backlash in the mesh, affording the effect of anti-backlash control without resorting to spring driven mechanisms.

Preferably the gear teeth comprise a material having a Young's modulus of less than 15 GPa, more preferably of less than 10 GPa, even more preferably of less than 5 GPa. More preferably the gear teeth consist essentially or consist of a material having a Young's modulus of less than 15 GPa, more preferably of less than 10 GPa, even more preferably of less than 5 GPa.

In an example, the gear teeth may comprise one or more polyamide (e.g. Nylon 6 and/or Nylon 6,6), polyacetal, saturated polyester, polyether, PES (polyethersulfone), PEI (polyetherimide), PPS (polyphenylene sulfide), PPA (polyphthalamide) and/or PAEK (polyaryletherketone).

The polymeric material preferably consists essentially of a repeat unit of formula I. Preferred polymeric materials comprise (or consist essentially of) a repeat unit wherein $t1=1$, $v1=0$ and $w1=0$; $t1=0$, $v1=0$ and $w1=0$; $t1=0$, $w1=1$, $v1=2$; or $t1=0$, $v1=1$ and $w1=0$. More preferred polymeric materials comprise (or consist essentially of) a repeat unit wherein $t1=1$, $v1=0$ and $w1=0$; or $t1=0$, $v1=0$ and $w1=0$. The most preferred polymeric material comprises (or consists essentially of) a repeat unit wherein $t1=1$, $v1=0$ and $w1=0$: in other words a homopolymeric polyetheretherketone.

In preferred embodiments, the polymeric material is selected from polyetheretherketone, polyetherketone, polyetherketoneetherketoneketone and polyetherketoneketone. In a more preferred embodiment, the polymeric material is selected from polyetherketone and polyetheretherketone. In another preferred embodiment, the polymeric material is polyetheretherketone such as a homopolymer polyetheretherketone.

The gear teeth preferably comprise at least 60 wt % said polymeric material, more preferably at least 80 wt %, even more preferably at least 90 wt %, even more preferably at least 99 wt %. More preferably the gear teeth consist essentially of or, more preferably, consist of said polymeric material.

Said anti-backlash gear may further comprise a filler means. Said filler means may include a fibrous filler or a non-fibrous filler. Said filler means may include both a fibrous filler and a non-fibrous filler. A said fibrous filler may be continuous or discontinuous. A said fibrous filler may be selected from inorganic fibrous materials such as metal fibres, non-melting and high-melting organic fibrous materials, such as aramid fibres, and carbon fibre. A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre. A fibrous filler may comprise nanofibres. A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles. Said filler means may comprise one or more fillers selected from glass fibre, carbon fibre, aramid fibres, carbon black and a fluorocarbon resin. Said anti-backlash gear may include 20 to 99.9 wt % (e.g. 20 to 70 wt %) of polymeric material and 0.1 to 80 wt % (e.g. 10 to 40 wt %) of filler means. Some preferred embodiments of said anti-backlash gear include more than 20 wt %, more preferably more than 25 wt % of filler means, but preferably less than 40 wt %, more preferably less than 35 wt % of filler means.

Said anti-backlash gear may further comprise one or more lubricant. Said lubricant may comprise one or more of PTFE (polytetrafluoroethylene) powder and/or silicone fluid. Preferably said plastic spur gear comprises less than 15 wt % of lubricant, more preferably less than 10 wt %, even more preferably less than 5 wt %.

The complementary gear may be a metal gear or a plastic gear. Preferably the complementary gear is a plastic gear. The complementary gear may be a straight-toothed gear or a helical gear.

Preferably the gear is an injection moulded gear. Gears can be produced with an injection moulding process, without the need for a subsequent machining operation (e.g. milling or grinding). Injection moulding allows for design freedom since the mould cavity can be modified to alter the gear as desired. The gear may be formed using additive layer by layer manufacturing such as filament fusion manufacturing or laser sintering.

The anti-backlash gear may be suitable for use in automotive applications; aerospace applications; oil and gas applications; conveyors; electronics; feeder drives; fishing applications; food processing; home and garden equipment e.g lawn sprinklers, drills and vacuum cleaners; marine steering; material handling; medical applications e.g. pumps; military applications; mixers; office equipment; packaging; paper processing; power transmission distributors; printing; punch presses; robotics; semiconductors; and/or stationary e.g. pencil sharpeners. In some preferred embodiments the anti-backlash gear is an automotive gear i.e. suitable for use in automotive applications.

According to a second aspect of the present invention there is provided a gear combination comprising:

an anti-backlash gear according to the first aspect, a complementary gear comprising a gearwheel and gear teeth, wherein the gear teeth of the anti-backlash gear are arranged to engage with the gear teeth of the complementary gear.

Said anti-backlash gear may have any feature of the anti-backlash gear of the first aspect of the present invention. Said complementary gear may have any feature of the complementary gear detailed above in relation to the first aspect of the present invention. The complementary gear may be a straight toothed gear.

According to a third aspect of the present invention there is provided a device and/or mechanism incorporating the anti-backlash gear according to the first aspect and/or the gear combination according to the second aspect.

Said device may be a vehicle such as an automobile, an aircraft or a train; or may be a device suitable in any of the other applications detailed above. Said mechanism may be a transmission.

According to a fourth aspect of the present invention there is provided the use of the anti-backlash gear according to the first aspect, the gear combination according to the second aspect and/or the device and/or mechanism according to the third aspect in automotive applications; aerospace applications; oil and gas applications; conveyors; electronics; feeder drives; fishing applications; food processing; home and garden equipment e.g. lawn sprinklers, drills and vacuum cleaners; marine steering; material handling; medical applications e.g. pumps; military applications; mixers; office equipment; packaging; paper processing; power transmission distributors; printing; punch presses; robotics; semiconductors; stationary e.g. pencil sharpeners.

Preferably said use is to avoid the need for backlash between the gear teeth of the anti-backlash gear and the gear teeth of a complementary gear.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE PREFERRED EMBODIMENT

Figure 1:
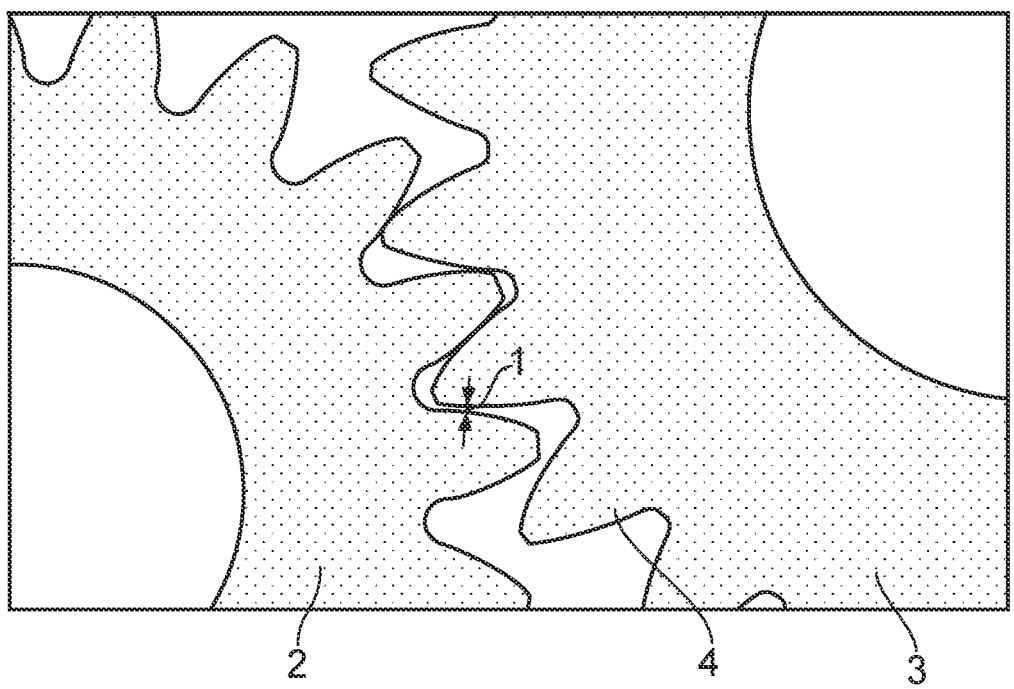
FIG. 1 is a schematic view of a prior art gear combination highlighting the attendant backlash control.

FIG. 1 is a schematic view of a prior art gear combination that shows the backlash 1 that is utilised in order to prevent the binding of the gears 2, 3. In FIG. 1, backlash 1 is shown as the distance between the two arrow heads i.e. the set clearance between meshing/engaging/mating teeth 4. As detailed above, in prior art gear combinations the backlash 1 is required to avoid gear jamming, but results in unwanted NVH and consequent wear of the gear teeth 4.

Figure 2:
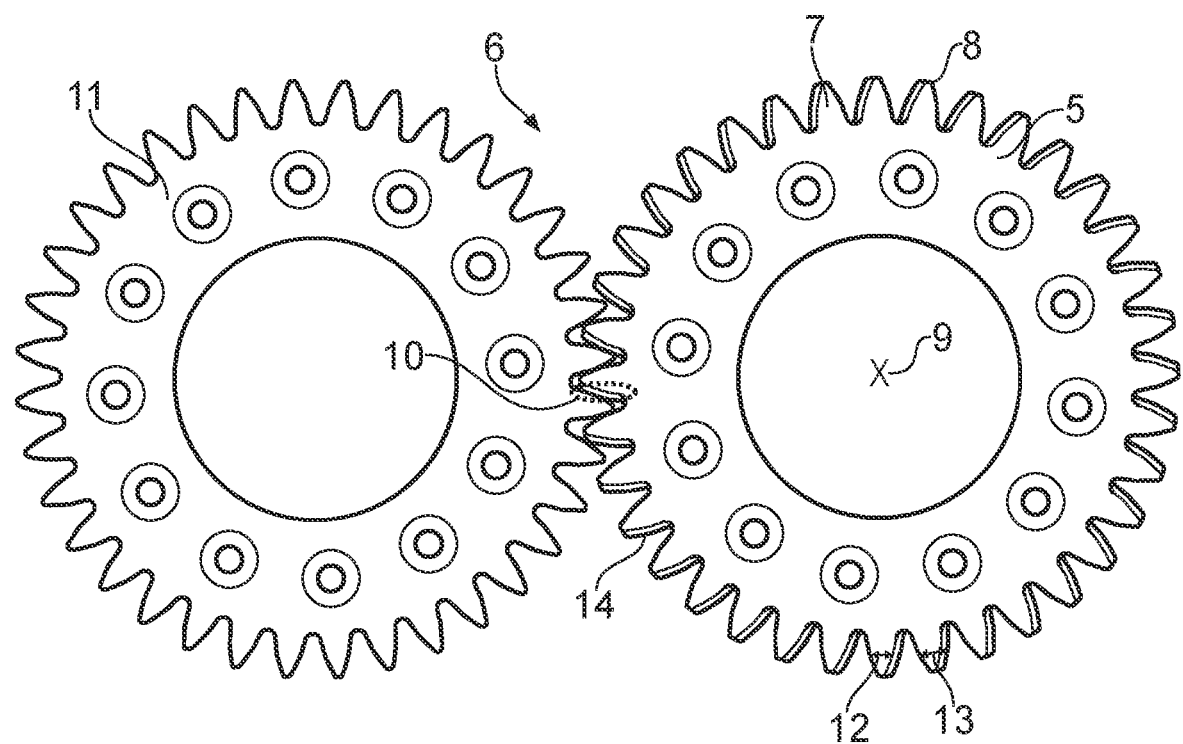
FIG. 2 is a schematic view of a helical anti-backlash gear and gear combination according to the present invention.

FIG. 2 is a schematic view of a plastic helical anti-backlash gear 5 and gear combination 6 according to the present invention. In this embodiment the plastic gear is a plastic helical gear 5 in which the top face and the bottom face of each gear tooth 7 are offset such that the gear teeth 7 are helical i.e. the gear teeth 7 are angled such that a leading surface 8 (i.e. a "top land/peak" or "tip", which in alternative embodiments may be a leading edge) of each gear tooth 7 is not parallel with respect to an axis of rotation 9 (marked by an "X" in FIG. 2, where the axis is perpendicular to the page) of the gear 5. Each gear tooth 7 of the plastic helical anti-backlash gear 5 is angled to the same degree. The region 10 indicates where a gap (i.e. backlash) would be present, when the teeth 7 are in mesh, if the teeth 7 of the helical gear 5 were not angled in a helical arrangement and the gear 5 was instead "straight-toothed" like complementary gear 11.

As shown in FIG. 2, the use of a helical gear 5 effectively increases the standard tooth thickness 12, affording a larger apparent tooth thickness 13, by decreasing the size of the gaps that the gear teeth 7 of the complementary gear can enter when the gears engage. Specifically, an edge (e.g. edge 14 in FIG. 2) of each gear tooth 7, wherein said edge 14 is located closest to one face of the gear wheel, is brought closer to an opposing edge of an adjacent gear tooth, wherein said opposing edge is located closest to an opposing face of the gear wheel. This arrangement ensures that when the gears 5, 11 engage there is no gap to create NVH and damage the gear teeth. The gear teeth 7 can still expand due to heat but, since there is only an edge (e.g. 14) of each tooth 7 in contact with a flank of a complementary tooth when the teeth are engaged, the tooth 7 can momentarily deform thereby flattening said edge (e.g. 14) and/or effectively "untwisting/straightening" the tooth 7 towards a straight-toothed arrangement, instead of binding the gear combination 6.

Surprisingly, using a helical gear 7 made of a polymeric material such as a PAEK or PEEK, in combination with a straight toothed gear 11, the effects of backlash can be reduced. This is because each tooth of the helical gear 7 contacts each tooth of the straight toothed gear 11 at the edge 14 or leading ridge of the helical gear tooth. The leading ridge 14 extends from the tip of the tooth to the base of the tooth. The leading ridge 14, on contact with the straight toothed gear, can deform, and thereby absorb backlash. A benefit of this arrangement is that backlash may be reduced and the gear, in use, creates less noise.

Figure 3:
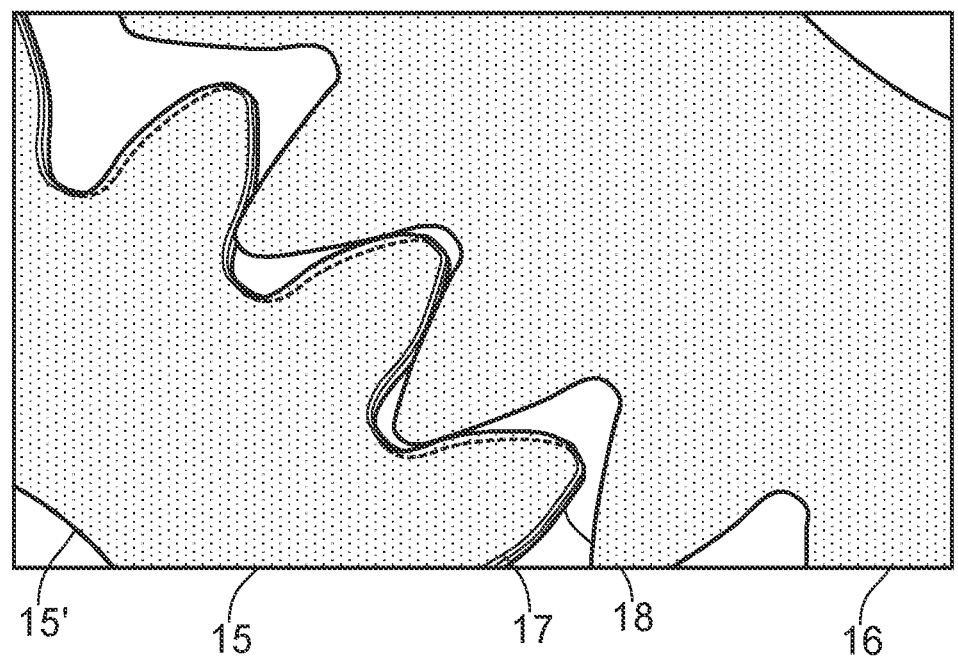
FIG. 3 is a schematic view of part of a non-helical anti-backlash gear and gear combination according to the present invention.

FIG. 3 is a schematic view of a polymeric anti-backlash gear and gear combination according to the present invention. FIG. 3 shows part of a polymeric anti-backlash gear 15 and part of a complementary gear 16 such as a standard gear. The gear 15 has a first gear face (shown) 15' and a second gear face on the opposing side of the gear (not shown). In this embodiment each of the gear teeth 17 of the plastic anti-backlash gear 15 are not angled (i.e. gear 15 is not helical) but instead an edge, ridge or protrusion 18 is provided on each gear tooth 17 such that the edge or ridge 18 protrudes from at least a first flank of each gear tooth 17.

Figure 4:
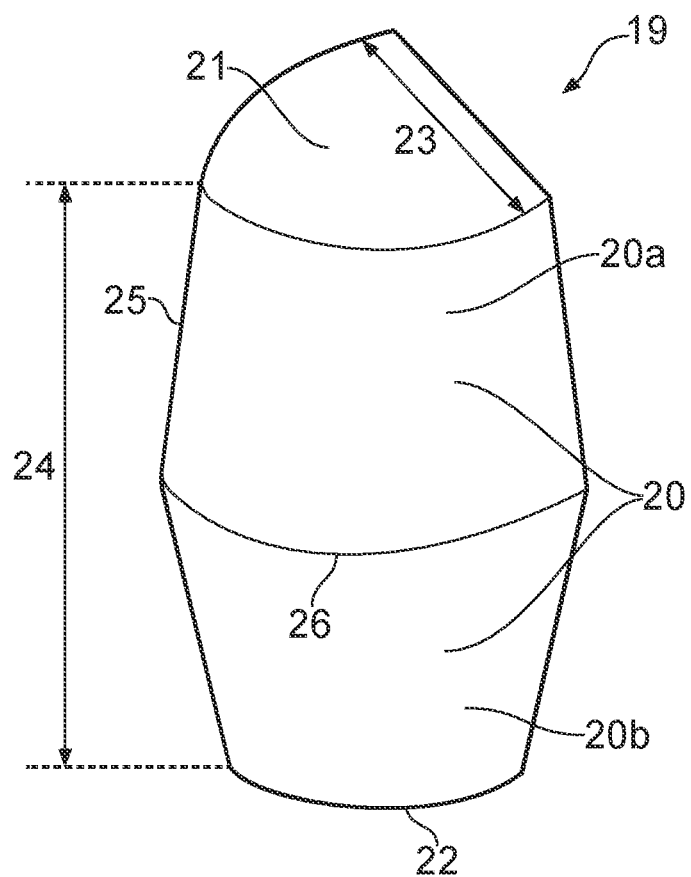
FIG. 4 is a perspective view of a gear tooth for an anti-backlash gear according to the present invention.

The first flank is provided with two or more surfaces as shown in FIG. 4. FIG. 4 shows an example of a single tooth 19 of the gear 15 shown in FIG. 3. For a straight toothed gear, the flank is a continuous surface following the continuous plane. The present invention requires that at least the first flank is provided with two or more surfaces wherein each surface has an orientation and the two orientations or directions of the planes of the surfaces are not the same. Consequently, a portion of each of the surfaces form the edge, ridge or protrusion 18. The orientation of the planes of the surfaces define the shape of the edge or 18. In use, the edge or ridge 18 is the first point of contact with the standard gear 16.

FIG. 4 provides additional detail regarding the flank 20. The flank is represented by the two surfaces 20a and 20b together. The gear tooth 19 has two flanks (but only one is shown) extending from the top tooth face 21 of the tooth 19 to the bottom tooth face 22 of the tooth 19. Double-headed arrow 23 indicates a tooth thickness at the top tooth face 21 of the tooth 19 (at a specified radial distance from an axis of rotation of an associated gear wheel). When we describe the tooth thickness varying between the top tooth face 21 and the bottom tooth face 22 we are referring to the thickness indicated by arrow 23. Double-headed arrow 24 indicates the distance between the top tooth face 21 and the bottom tooth face 22 of said gear tooth 19 in a direction perpendicular to both the top tooth face 21 and the bottom tooth face 22 of said gear tooth 19 (i.e. reference 24 indicates the face width of the tooth 19 and the direction or arrow 24 is parallel to an axis of rotation of the gearwheel in operation). Leading edge 25 (i.e. a "top land/peak" or "tip") is also shown.

Protruding edge or ridge 26 is located approximately halfway along the face width 24 and spans the flank 20 from the tip of the tooth to the root of the tooth. In some examples, the protruding ridge 26 may be located slightly off centre such as a third of the face width from the first tooth face or two thirds of the face width from the first tooth face of between those extremes.

In certain examples, the protruding ridge 26 extends only along a portion of the flank 20. In one example, the angle between two surfaces 20a, 20b of the first flank is less than 170 degrees, such that the angle of the ridge is less than 170 degrees. In some embodiments, the angle is less than 160 degrees, and in others the angle is less than 150 degrees, even more preferably less than 140 degrees, but preferably more than 60 degrees, even more preferably more than 80 degrees, even more preferably more than 100 degrees, even more preferably more than 120 degrees.

The gear teeth of the anti-backlash gear are arranged to engage with gear teeth of a complementary gear (such as a straight toothed gear) in operation so that each gear tooth of the anti-backlash gear initially, and preferably solely, contacts one or more gear teeth of the complementary gear at the ridge of the each gear tooth of the anti-backlash gear. The ridge of the gear tooth is deformable on contact with the gear tooth of the complementary gear and as the ridge is deformed backlash is absorbed. The ridge is deformable because the gear comprises a polymeric material such as a PAEK or a PEEK. The material properties of PAEK and PEEKs enable the ridge 18 to absorb backlash when the gear is in use.

In one example (such as shown in FIG. 3), a protruding ridge 18 is provided on both flanks. In another example, a protruding ridge is provided only provided on one flank. In order to obtain the equivalent benefit to a gear tooth with a protruding ridge on both flanks, the size of the protruding ridge may be increased. For example, another valid solution would be to utilise such an edge on just one flank of each tooth, but make the protrusion of the edge twice as large. Edge 18 is formed by a gradual variance of the thickness of each gear tooth 17 between the top or first tooth face and the bottom or second tooth face of said gear tooth 17 in a direction perpendicular to both the top tooth face and the bottom tooth face of said gear tooth (sometimes termed the direction of the face width; said direction would also be parallel to an axis of rotation of the gear wheel in operation). The flanks from which the edges 18 protrude each have two surfaces only. This embodiment utilises the change in the tooth thickness of the tooth 17 to provide edge 18 that contacts one or more gear teeth of the complementary gear 16, momentarily deforming if necessary (but not causing the gears 15,16 to bind due to the relatively small surface area of contact), thereby affording an anti-backlash function.

Figure 5:
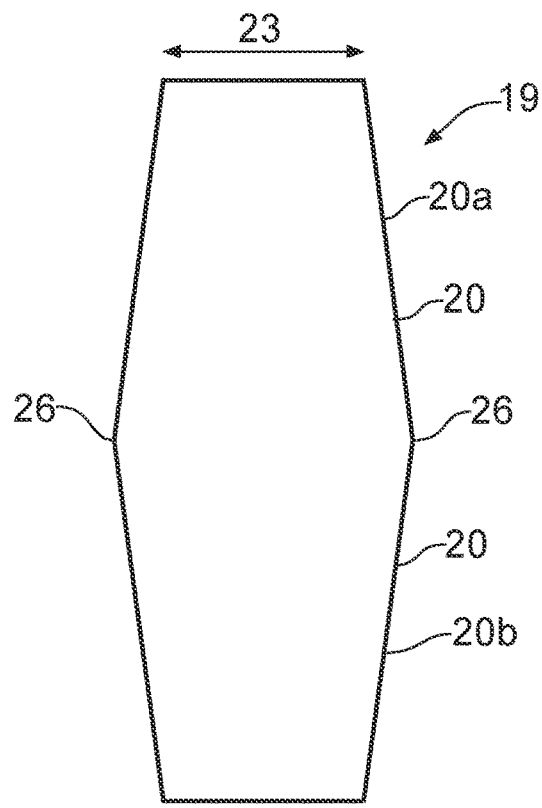
FIG. 5 is a cross sectional view of a gear tooth for an anti-backlash gear according to the present invention.

FIG. 5 is a cross sectional view of a gear tooth 19 for a polymeric anti-backlash gear according to the embodiment of the previous paragraph. The cross section is taken along the line of the tooth thickness 23 shown in FIG. 4. FIG. 5 provides a convenient illustration of how protruding edges 26 affect the profile of tooth 19. The flank 20 is formed from surfaces 20a and 20b.

Figure 6:
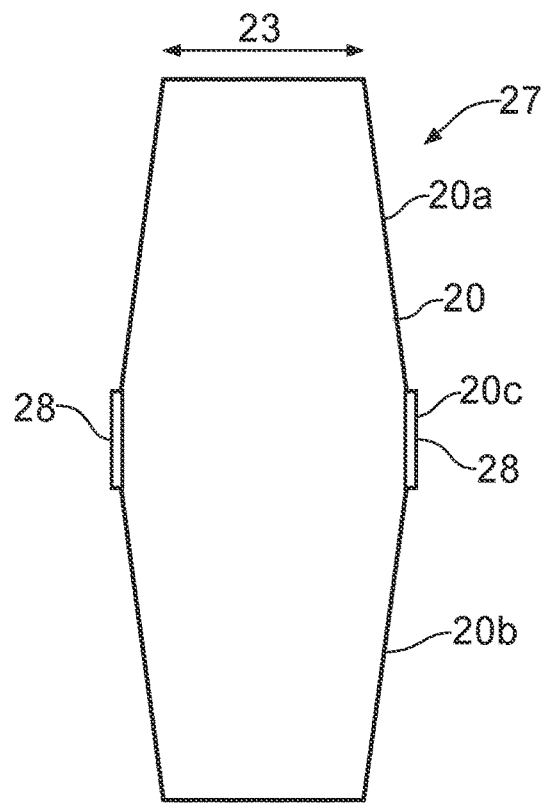
FIG. 6 is a cross sectional view of a gear tooth for an anti-backlash gear of a different embodiment according to the present invention.

FIG. 6 is a cross sectional view of a gear tooth 27 for a plastic anti-backlash gear according to a different embodiment to that shown in FIG. 5. The protrusion from the flank comprises a protruding ridge 28 having a flat surface. The cross section is taken along the line of the tooth thickness 23 shown in FIG. 4 but instead of protruding edge 26 the flank 20 is formed from three surfaces, 20a, 20b and 20c such that the flank includes a protruding surface 28. The use of a protruding surface 28 can counteract the effects of wear by providing a larger surface area for a complementary gear to contact.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An anti-backlash gear comprising:
a gear wheel and gear teeth,
wherein each gear tooth comprises first and second flanks, a top face and a bottom face,
wherein for each gear tooth each flank extends from the top face to the bottom face, wherein the gear teeth comprise a polymeric material which comprises a repeat unit of formula I

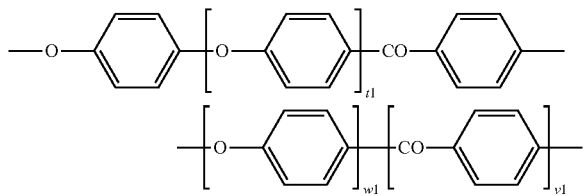

wherein t1, and w1 independently represent 0 or 1 and v1 represents 0, 1 or 2, and wherein for each gear tooth at least one of said flanks comprises two or more surfaces arranged to form a single protrusion extending along the at least one said flank such that a tooth thickness of each gear tooth varies between the top face and the bottom face of said gear tooth in a direction parallel to an axis of rotation of the gear wheel in operation, wherein the single protrusion, in use, is elastically deformable so as to absorb backlash.

2. The anti-backlash gear according to claim 1, wherein the gear teeth are together a one-piece unit.

3. The anti-backlash gear according to claim 1, wherein the anti-backlash gear is a driving gear in operation, and for each gear tooth at least one of said flanks, that comprises one or more surfaces arranged such that a tooth thickness of each gear tooth varies between the top face and the bottom face of said gear tooth in a direction parallel to an axis of rotation of the gearwheel in operation, is not a driving flank in operation.

4. The anti-backlash gear according to claim 1, wherein the anti-backlash gear is a driven gear in operation, and for each gear tooth at least one of said flanks, that comprises one or more surfaces arranged such that a tooth thickness of each gear tooth varies between the top face and the bottom face of said gear tooth in a direction parallel to an axis of rotation of the gearwheel in operation, is not a driven flank in operation.

5. The anti-backlash gear according to claim 1, wherein said protrusion from said at least one flank is present over less than 90%, preferably less than 75%, more preferably less than 60%, even more preferably less than 50% of a length of said flank.

6. The anti-backlash gear according to claim 1, wherein said two or more surfaces, arranged such that a tooth thickness of each gear tooth varies between the top face and the bottom face of said gear tooth in a direction parallel to an axis of rotation of the gear wheel in operation, each have a flat profile (i.e. said one or more surfaces each appears to be flat) when viewing a cross section of each gear tooth taken along a plane that intersects a given radius "y", coincident with an axis of rotation of the gear wheel in operation, wherein the intersection occurs at each flank of a gear tooth at each location that is coincident with given radius "y".

7. The anti-backlash gear according to claim 1, wherein the protrusion from said at least one flank comprises one or more protruding edge.

8. The anti-backlash gear according to claim 7, wherein the gear teeth of the anti-backlash gear are arranged to engage with gear teeth of a complementary gear in operation such that each gear tooth of the anti-backlash gear initially, and preferably solely, contacts one or more gear teeth of the complementary gear at said one or more protruding edge of said each gear tooth of the anti-backlash gear.

9. The anti-backlash gear according to claim 7, wherein said flank from which said protruding edge protrudes each comprises two surfaces only, and wherein the angle between said two surfaces at said protruding edge is less than 170 degrees, preferably less than 160 degrees, more preferably less than 150 degrees, even more preferably less than 140 degrees, but preferably more than 60 degrees, even more preferably more than 80 degrees, even more preferably more than 100 degrees, even more preferably more than 120 degrees.

10. The anti-backlash gear according to claim 1, wherein the protrusion from said at least one flank comprises a protruding surface.

11. The anti-backlash gear according to claim 10, wherein said protruding surface is formed by said at least one flank comprising three or more surfaces, and wherein the height of the protruding surface is less than 50%, preferably less than 40%, more preferably less than 30%, even more preferably less than 20%, but preferably more than 1%, more preferably more than 3%, even more preferably more than 4%, even more preferably more than 5%, of the distance between the top face and the bottom face in a direction parallel to an axis of rotation of the gear wheel in operation.

12. The anti-backlash gear according to claim 1, wherein, for each gear tooth where at least one of said flanks is angled such that said flank is not parallel with respect to an axis of rotation of the gear wheel in operation, at least one of the first and second flanks of each gear tooth are angled away from perpendicular to the top face and the bottom face of said each gear tooth by at least 2 degrees, more preferably at least 3 degrees, even more preferably at least 4 degrees, but preferably by at most 8 degrees, more preferably at most 7 degrees, even more preferably at most 6 degrees.

13. The anti-backlash gear according to claim 1, wherein the polymeric material is selected from polyetheretherketone, polyetherketone, polyetherketoneetherketoneketone and polyetherketoneketone.

14. The anti-backlash gear according to claim 1, wherein the gear teeth consist essentially of or, preferably, consist of said polymeric material.

15. The anti-backlash gear according claim 1, wherein the gear is an injection moulded gear.

16. The anti-backlash gear according to claim 1, wherein the anti-backlash gear is suitable for use in automotive applications; aerospace applications; oil and gas applications; conveyors; electronics; feeder drives; fishing applications; food processing; home and garden equipment e.g. lawn sprinklers, drills and vacuum cleaners; marine steering; material handling; medical applications e.g. pumps; military applications; mixers; office equipment; packaging; paper processing; power transmission distributors; printing; punch presses; robotics; semiconductors; and/or stationary e.g. pencil sharpeners.

17. A gear combination comprising the anti-backlash gear according to claim 1 and further comprising,
a complementary gear comprising a gearwheel and gear teeth,
wherein the gear teeth of the anti-backlash gear are arranged to engage with the gear teeth of the complementary gear.

18. A device incorporating the anti-backlash gear according to claim 17.

19. The gear combination according to claim 17 wherein the gear combination is used in automotive applications; aerospace applications; oil and gas applications; conveyors; electronics; feeder drives; fishing applications; food processing; home and garden equipment e.g. lawn sprinklers, drills and vacuum cleaners; marine steering; material handling; medical applications e.g. pumps; military applications; mixers; office equipment; packaging; paper processing; power transmission distributors; printing; punch presses; robotics; semiconductors; stationary e.g. pencil sharpeners.

20. The anti-backlash gear according to claim 19, wherein said use is to avoid the need for backlash between the gear teeth of the anti-backlash gear and the gear teeth of a complementary gear.

* * * * *